(12) United States Patent
Gafri et al.

(10) Patent No.: US 6,630,649 B1
(45) Date of Patent: Oct. 7, 2003

(54) INDUCING PHYSICAL CHANGES IN METAL OBJECTS

(76) Inventors: Oren Gafri, Vinik Street 43, 75241 Rishon Le-Zion (IL); Yuri Livshiz, Popel Street 4/7, 75355 Rishon Le-Zion (IL)

( * ) Notice: Subject to any disclaimer, the term of this patent is extended or adjusted under 35 U.S.C. 154(b) by 0 days.

(21) Appl. No.: 09/719,499

(22) PCT Filed: Jun. 14, 1999

(86) PCT No.: PCT/IL99/00322
§ 371 (c)(1),
(2), (4) Date: Feb. 20, 2001

(87) PCT Pub. No.: WO99/65636
PCT Pub. Date: Dec. 23, 1999

(30) Foreign Application Priority Data

Jun. 14, 1998 (IL) .................................. 124899

(51) Int. Cl.[7] .................................................. H05B 6/10
(52) U.S. Cl. ...................................... 219/603; 219/617
(58) Field of Search ........................... 219/603, 602, 219/607, 610, 612, 616, 617, 633, 643, 659, 152, 149; 29/599

(56) References Cited

U.S. PATENT DOCUMENTS

| | | | |
|---|---|---|---|
| 3,171,014 A | * | 2/1965 | Ducati .......................... 219/149 |
| 3,175,383 A | * | 3/1965 | Levine .......................... 29/599 |
| 3,258,573 A | | 6/1966 | Morin et al. |
| 3,560,693 A | | 2/1971 | Morin, Jr. |
| 3,603,759 A | * | 9/1971 | Peacock ........................ 219/611 |
| 3,794,805 A | | 2/1974 | Rudd |
| 3,961,739 A | | 6/1976 | Leftheris |
| 3,998,081 A | | 12/1976 | Hansen et al. |
| 4,135,379 A | | 1/1979 | Hensen et al. |
| 4,150,274 A | | 4/1979 | Minin et al. |
| 4,438,317 A | | 3/1984 | Ueguri et al. |
| 5,416,299 A | | 5/1995 | Tabata et al. |
| 5,726,419 A | | 3/1998 | Tabata et al. |
| 6,452,139 B1 | * | 9/2002 | Benoit et al. ................ 219/617 |

FOREIGN PATENT DOCUMENTS

WO  97 22426  6/1997

OTHER PUBLICATIONS

Karakozov et al., "Friction welding dissimilar materials with high–pressure pulsed forging", *Welding International,* vol. 6, No. 2, pp. 121–123.

* cited by examiner

*Primary Examiner*—Quang T. Van
(74) *Attorney, Agent, or Firm*—Browdy & Neimark, P.L.L.C.

(57) ABSTRACT

A method and apparatus for inducing a physical change in at least one metal workpiece are provided. Energy is applied to at least a portion of the metal workpiece, the energy being a combination of energies of at least two distinct sources. One of these energies is a pulsed magnetic force (PMF) energy which induces a rapid movement in a portion of the metal workpiece. The second energy is one which acts synergistically with the first energy to impart the desired physical change.

34 Claims, 8 Drawing Sheets

INDUCING PHYSICAL CHANGES IN METAL OBJECTS

The present application is the national stage under 35 U.S.C. 371 of PCT/IL99/00322, filed Jun. 14, 1999.

FIELD OF THE INVENTION

The invention relates to methods and apparatus for inducing physical changes in metal objects in general and making use of pulsed magnetic force (PMF) energy therefor, in particular.

BACKGROUND OF THE INVENTION

The employment of PMF, for forming, joining or welding of metal objects is known in the art. In this process, current is rapidly discharged through a coil, which is proximal to the workpiece. Owing to eddy currents in the workpiece, an intense magnetic pressure builds up, which may perform work on at least a portion of the workpiece. Typically, the portion of the workpiece, which is proximal to the working coil of the PMF apparatus, is induced into a rapid movement and the kinetic energy associated with this movement gives rise to said physical change. The change may be forming namely a change in the shape of the object. At times, the rapid movement of said portion is induced only on a microscopic scale. For example, in the case of joining or welding two metal workpieces, portions thereof are placed into close proximity and they in fact touch one another. But nevertheless notwithstanding this close proximity some clearance between the two remains even if only on a microscopic scale which permits a short rapid movement of a portion of at least one of the workpieces (obviously over only a very short distance). This suffices for the build-up of kinetic energy, which dissipates upon impact with a portion of the other workpiece and may give rise to joining or welding of the two workpieces to one another.

GENERAL DESCRIPTION OF THE INVENTION

The present invention is directed to a method and apparatus for working, i.e. inducing physical change in at least one metal workpiece. The term "physical change" denotes structural change in form or shape, cutting off of a portion of a workpiece, perforation of a workpiece, joining of two or more workpieces to one another or welding two workpieces or portions thereof to one another. The term "joining" used before and further below means to denote a tight engagement of two workpieces to one another, for example, tight fitting of a generally cylindrical object over a tubular object fitted within it; and the term "welding", in distinction from joining, means to denote a very tight interaction of the surfaces of two objects, e.g. metalurgical bonding of at least a portion of the two workpieces.

The method and apparatus of the invention make use of pulsed magnetic force (PMF) energy. In accordance with the invention, PMF energy is combined with another energy from a separate energy source which acts synergistically with the PMF energy to impart a physical change. The other energy source (to be referred to herein at times as the "auxiliary energy source") may be another PMF energy, may be a mechanical energy source, and many others.

In accordance with a first aspect of the invention there is thus provided a method for inducing a physical change in at least one metal workpiece, comprising:

(a) transferring at least one pulse magnetic force (PMF) energy to at least a portion of the at least one workpiece for inducing an intense magnetic pressure therein; and (b) transferring an auxiliary energy at least partially co-extensive with the PMF energy to the at least a portion of the workpiece whereupon the PMF and auxiliary energies combine to yield the physical change.

In accordance with another aspect of the invention there is provided an apparatus for inducing a physical change in at least one metal workpiece, comprising:

(i) at least one PMF unit with a forming coil for the discharge of current therethrough to induce an intense magnetic pressure in at least a portion of the metal workpiece; and (ii) at least one auxiliary energy source for transferring, at least partially co-extensive with the current discharge through the forming coil, an auxiliary energy to the at least a portion of the workpiece such that said pressure and auxiliary energy synergize to yield said physical change.

The term "transferring energy" or any similar term which may be used herein, means to denote the transfer of energy to a workpiece in a form which at least partially acts to yield said physical change. The term "metal workpiece" refers to any metal object which is to be worked by the method or apparatus of the invention, which may be a cylindrical object which is to be joined or welded to a tubular or another cylindrical objection; a metal plate which is to be formed, cut or perforated; etc. As will be appreciated, the invention is not limited to a workpiece of any specific kind but rather can be applied for a myriad of different workpieces and for inducing a wide variety of different physical changes.

The term "combination of energies" or the like means to denote the timed activation of the at least two energy sources to transfer their respective energies to the at least one workpiece such that the periods of their transfer at least partially overlap, whereby the combined effect of the two energies, as far as inducing the physical change, is substantially larger than the physical change which may be imparted by only one of the energy sources. The combination of energies in accordance with the invention gives rise to a variety of improvements over the use of PMF alone. For example, in the case of welding or joining of two metal workpieces to one another, the same result may be achieved with a lower PMF energy as compared to PMF alone. This may have design consequences as the generation of a large PMF necessitates large capacitor banks and thus an apparatus in accordance with the invention may have an overall smaller size.

Additionally, the present invention allows the achievements of results, which may be difficult to achieve in accordance with the prior art. For example, in the case of welding two tubular workpieces to one another, with one enveloping the other, the strong impact of the external one onto the internal one, may give rise to squeezing or crushing of the internal tubular workpiece. However, in accordance with the invention, which permits use of smaller PMF pulses for achieving the same effect, such an undesired effect may be eliminated or reduced. In the case of welding, the combination of energies in accordance with the invention may give rise to an increase of the area of the weld.

At least for the case of welding, it is preferred that the time period overlap be substantial, meaning that at least one of the energies is applied such that throughout most of its period of application, it overlaps the other applied energy. This may mean, for example, that both may begin and end simultaneously, both may begin simultaneously and end in succession, both may begin in succession but end simultaneously, one beginning and ending during the period the other energy is applied, and various combinations of these scenarios.

While one energy source is always a PMF energy source from a PMF device, to be referred to herein at times as "primary PMF energy source"/"primary PMF device", the other energy source may be selected from a wide variety of different sources. In accordance with one preferred embodiment, the other energy source is an auxiliary PMF energy source of a different specification. In accordance with other embodiments, the other energy source is a device for generating a mechanical shock wave or mechanical vibrations in the workpiece; a device which can generate ultrasonic vibrations within the object, e.g. a device as customary used in ultrasonic welding; a device for transferring an electric current through an interface between portions of workpieces which are to be welded to one another, such as that used in resistant welding; etc.

It should be noted that the term "primary" used above and further below, does not mean to denote that this energy source is of prime importance as compared to other sources of energy used in accordance with the invention. Similarly, the term "auxiliary" should not be understood as meaning secondary in importance. Rather, these terms are used merely for the sake of convenience. It should be appreciated that in order to yield any efficient physical change in accordance with the invention is achieved by the combination of the primary and the auxiliary energy sources, as mentioned above and further below.

The primary and the auxiliary energies which are used in combination in accordance with the invention, are superimposed, namely they are generated such that there are applied for periods of time overlapping one another over substantial portions thereof. In accordance with one embodiment, the primary PMF energy is generated simultaneously with the auxiliary energy. In accordance with another embodiment, the auxiliary energy is initiated prior or after the primary PMF energy.

At times, the total amount of the transferred primary energy may be larger than the total amount of the transferred auxiliary energy, at times they may be about the same or at time the total of the auxiliary energy may exceed the total of the primary energy.

In accordance with one embodiment, the auxiliary energy is PMF energy. The apparatus in accordance with this embodiment comprises two discharge circuitries, one for discharging a primary electric current through the primary working coil, and another for discharging an auxiliary electric current through an auxiliary working coil, which may be the same or different than the primary working coil. The auxiliary electric current has a frequency which is substantially different (larger or smaller) than that of the primary electric current, typically larger, e.g. 5–100 times larger. For example, the primary pulse may have a period of 100–200 sec (a frequency of 10,000–5,000 Hz, respectively) while the period of the auxiliary pulse may have a period of about 6–10 sec. The auxiliary pulse in such a case is typically initiated after a certain period of time from the initiation of the primary pulse, e.g. after about 20–40 sec, respectively (when the primary pulse is close to its pick). The auxiliary pulse is timed so as to synergize with the primary pulse to yield said physical effect.

The amplitude of the primary current may be larger than the primary current, e.g. 2–50 times that of the primary current, or at times may be about the same.

By another embodiment, said auxiliary energy is a mechanical energy imparted by inducing rapid movement in at least one of the two metal objects. Such movement may be a mechanical shock or vibrations. In accordance with one embodiment, the mechanical energy is imparted onto the at least one metal object by means of a mechanical waveguide. The waveguide may be associated with an auxiliary working coil connected to a current discharge circuitry which, by means of a PMF, generates mechanical vibration waves in said waveguide which are then transmitted to the metal object. Alternatively, the waveguide may be associated with a discharge-in-fluid (DIF) device, which generates a shock wave, which is then transmitted by the waveguide to at least one of the objects. The DIF device comprises a fluid chamber with discharge electrodes provided within the chamber for discharging an electric current between them and through the fluid. When an electric current is discharged between the electrodes, a plasma forms within the fluid which generates a shock wave within the fluid which is then transmitted to the waveguide. The fluid is typically an aqueous solution.

In accordance with another embodiment, the mechanical energy is an ultrasonic energy.

While the present invention is applicable in general for yielding a more efficient physical change of at least one workpiece, it is particularly applicable to welding of two metal workpieces to one another ("the welding embodiment"). The welding embodiment is a preferred embodiment of the present invention. In accordance with this preferred, welding embodiment, there is provided a method for welding two metal objects to one another, comprising:

(a) during a first period of time, generating a primary pulsed magnetic force (PMF) energy by discharging a primary electric current through a primary working coil so as to induce an intense magnetic pressure on at least one portion of a first of the two metal objects to cause said portion to move towards an impact at least one other portion of the second metal workpiece;

(b) during a second period of time, transferring to at least one of the two metal objects, an auxiliary energy which is other than said primary PMF energy, said first time period and said second time period overlap one another over at least a substantial portion of one of said first or said second time periods, whereby said auxiliary energy in combination with the PMF energy causes welding of the at least two portions to one another.

In accordance with the welding embodiment there is further provided an apparatus for welding of two metal objects to one another comprising:

a primary electric discharge circuitry with a primary working coil for generating, during a first period of time of a working cycle of the apparatus, a pulsed magnetic force (PMF) to cause at least a portion of a first of the two metal objects to move towards an impact of this said portion of a second of the two metal objects; and a device for generating, during a second period of time of the working cycle of the apparatus, an auxiliary energy and transferring it to at least one of the two metal objects which said first period of time and said second period of time overlap one another over at least a substantial portion of one of said first or said second period of time, whereby said auxiliary energy in combination with the primary PMF energy, causes welding of the two portions to one another.

For welding, a combination of PMF energy with any of the energies discussed above may be applicable. In addition, in the case of welding, the auxiliary energy may also be an electric current induced to pass through the interface between portions of the two metal workpieces, which are to be welded to one another. This embodiment may make use of electrodes of the kind customarily used in resistant welding, which are generally known per se.

The auxiliary energy, in accordance with another embodiment, particularly applicable to the case of welding, but may also be applicable to other embodiments dealing with different kinds of physical changes, mentioned above, is an auxiliary energy source which causes heating of the at least a portion of the metal workpiece. Such heating may be achieved by an ultrasound energy source, generally known per se, may be achieved by induction heating which is also generally known per se, and by a variety of other heating means known per se. In this case, after the workpiece has been heated, the effect of the PMF may be more pronounced than without heating.

As may be appreciated, the auxiliary energy source used in the method and apparatus of the invention may be a combination of the auxiliary energy sources discussed above. Thus, in such a case the energy applied to the metal workpiece is a combination of three or more superimposed energies. For example, a combination of induction heating and an auxiliary PMF.

BRIEF DESCRIPTION OF THE DRAWINGS

In order to understand the invention and to see how it may be carried out in practice, the invention will now be described, by way of non-limiting example only in the following detailed description, with reference to the accompanying drawings, in which.

DETAILED DESCRIPTION OF PREFERRED EMBODIMENTS

Figure 1:
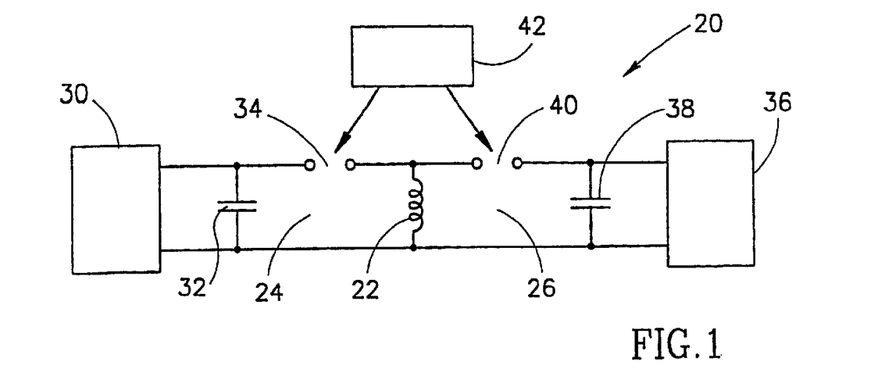
FIG. 1 is a scheme illustrating an embodiment of an apparatus of the invention for discharging a primary and auxiliary current through a working coil to yield a superimposed PMF for welding of two metal objects one to another.

Reference is first being made to FIG. 1, showing a scheme of an apparatus 20 in accordance with an embodiment of the invention comrprising a working coil 22 and two discharge circuitries 24 and 26. Discharge circuitry 24 consists of a power supply 30, a capacitor battery 32, which may consist of a single or a plurality of capacitors and a high current switch 34. Similarly, discharge circuitry 26 consists of a power supply 36, capacitor battery 38 and a switch 40. Switches 34 and 40 are controlled by means of an ignition circuitry 42 which provides a trigger to these switches. Switches 34 and 40 may be any one of a variety of high current switches known per se, such as a controlled vacuum discharger of the kind disclosed in PCT Application No. PCT/IL 97/00383.

Circuitry 24 is designated here as the primary circuitry and circuitry 26 as the auxiliary circuitry. In this specific embodiment, as can be seen, both the primary discharge current of circuitry 34 and the auxiliary discharge current of circuitry 26 are discharged through the single working coil 22.

Figure 2A:
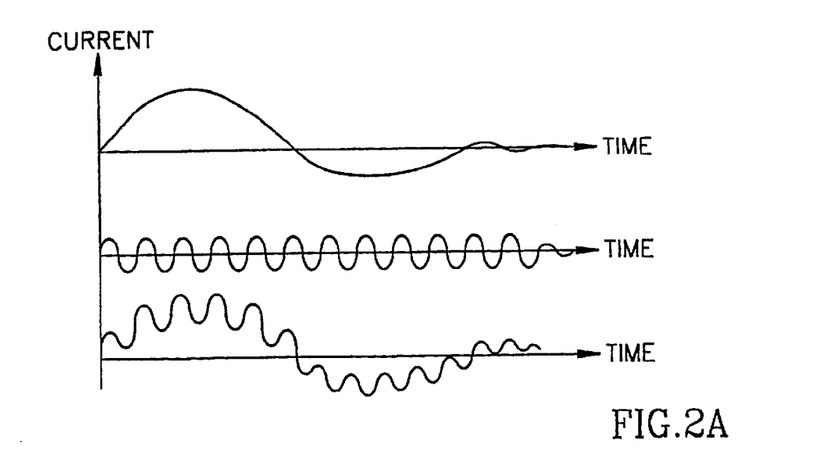
FIGS. 2A–2C show three different embodiments on the manner of superimposing a primary electric current and an auxiliary electric current to yield a superimposed PMF current.
Figure 2B:
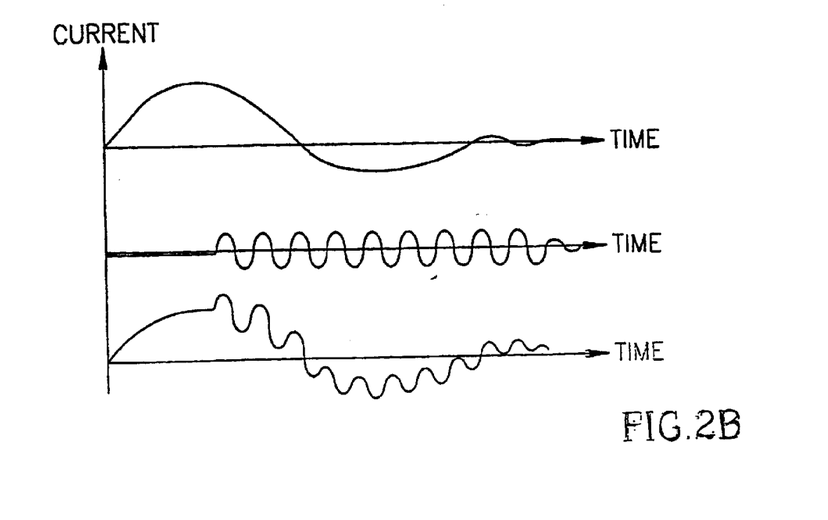
Figure 2C:
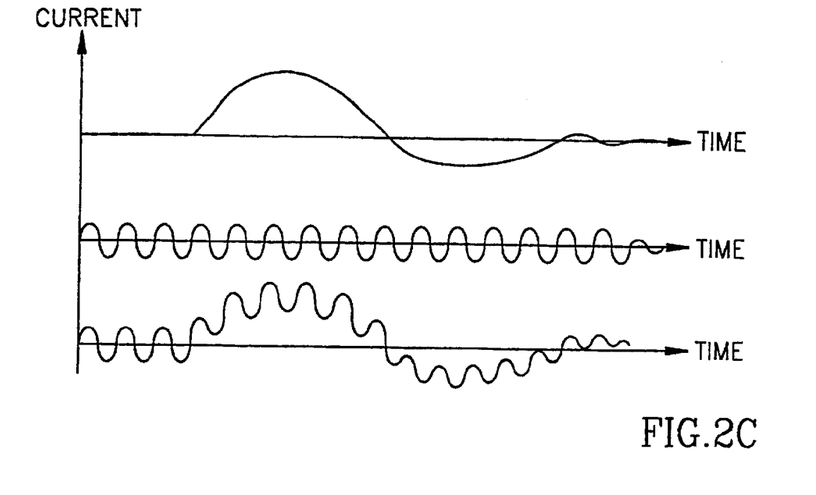

FIGS. 2A–2C show several different combinations of a primary and auxiliary discharge currents to yield a combined, superimposed PMF-generating current The primary discharged current, which is represented by the upper curve of FIGS. 2A–2C, has typically an amplitude of about 10–200 kA, typically 100 kA and an initial oscillation frequency of about 10–100 KHz. The auxiliary discharged current, illustrated as the middle curve in each of FIGS. 2A–2C has typically a frequency of about 50–1000 KHz and an amplitude of about 1–10 kA. The two different current may be discharged simultaneously (FIG. 2A); or the auxiliary current may be discharged after (FIG. 2B) or prior (FIG. 2C) the primary current. The superimposed current is illustrated as the lower curve in each of FIGS. 2A–2C. It has been realized in accordance with the invention that such a superimposed PMF current gives rise to efficient welding, without the need to substantially increase the current intensity and fine tune the current discharge parameters, as was needed in the prior art PMF processes.

Superpositioning of the energies from two different sources may be performed in a similar manner also in the embodiments illustrated below in FIGS. 3–13, namely both sources may be activated simultaneously or one with a delay after the other.

Figure 3:
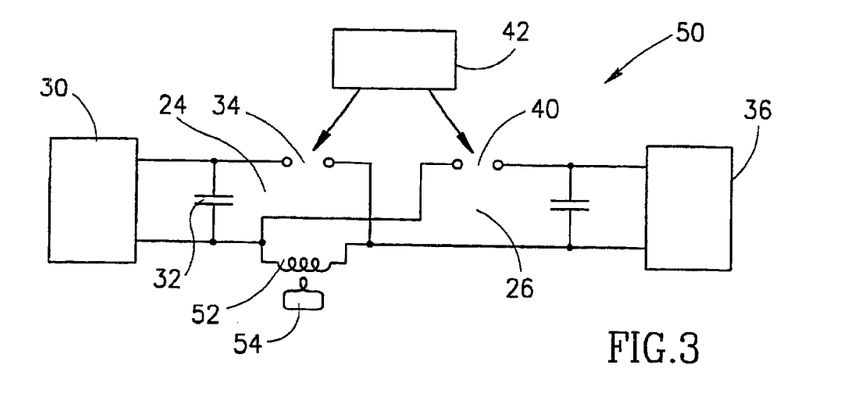
FIGS. 3 and 4 show schemes of two other embodiments of an apparatus combining a primary and an auxiliary discharge currents to yield a super positioned PMF forming current.
Figure 4:
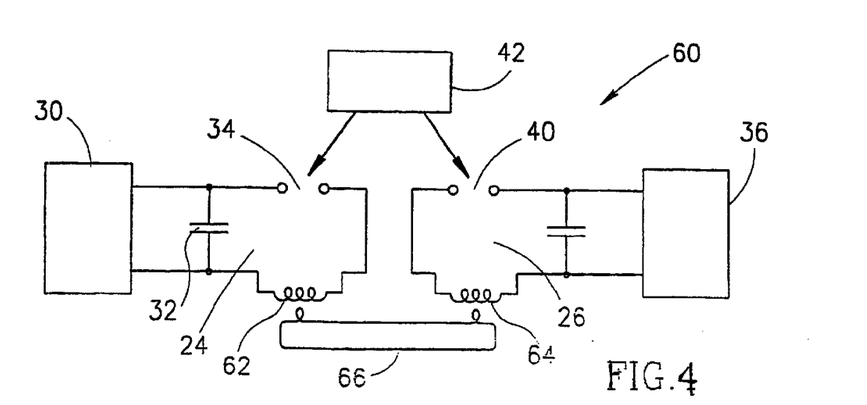

FIGS. 3 and 4 show a scheme of apparatuses 50 and 60 respectively, in accordance with two other embodiments of the invention. In FIGS. 3 and 4, like reference numerals to those of FIG. 1 were used to show like elements. The apparatus 50 of FIG. 3 differs from that of FIG. 1, in that coil 52 which is connected to both circuitries, is in inductive relationship with forming coil 54, in this specific embodiment a single wind coil. In the case of apparatus 60 of FIG.

4, the primary discharge circuitry 24 and the auxiliary discharge circuitry 26 are independent and are provided with coil 62 and 64 respectively, which are in inductive association with forming coil 66.

Figure 5:
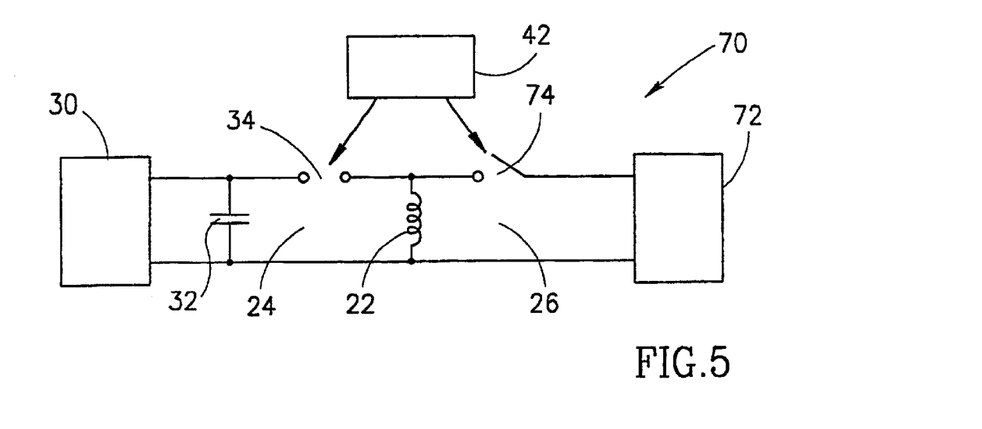
FIG. 5 shows another embodiment of an apparatus in accordance with the invention, which is a modification of that shown in FIG. 1, wherein the auxiliary current is generated by a high frequency generator connected to the working coil through a high voltage breaker.

An apparatus 70 in accordance with another embodiment of the invention is shown in FIG. 5. Here again, like elements to those of FIG. 1 have been given like reference numerals. In apparatus 70, discharge circuitry 26 is provided with a high frequency generator 72, typically capable of generating current at a frequency of about 100–1000 KHz, which is connected to coil 22 through high voltage breaker 74, e.g. a Fe-controlled vacuum switch.

Figure 6:
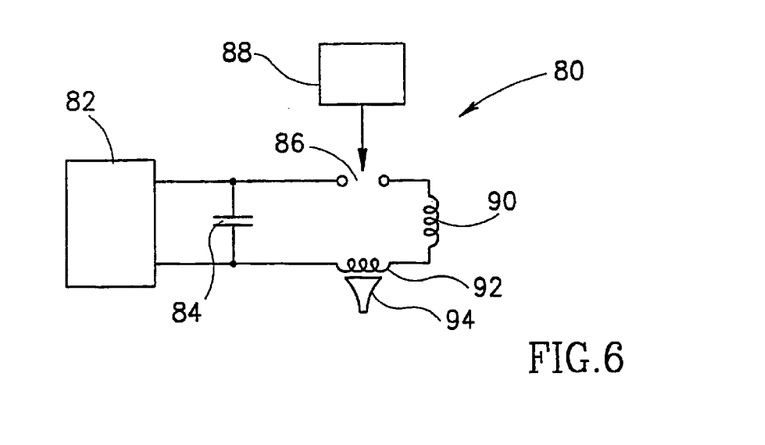
FIG. 6 is a scheme of an apparatus in accordance with another embodiment of the invention wherein the auxiliary energy is provided by means of a mechanical waveguide with an associated working coil.

The forming coils 22 of FIGS. 1 and 5, 54 of FIG. 3, 66 of FIG. 4 and 90 of FIG. 6, may have a design of a forming coil as disclosed in PCT Application, Publication No. WO 97/22426 and PCT Application, Publication No. WO 98/23400. However, as will no doubt be appreciated, the invention is not limited to these types of coils. The type of coil and its design will obviously depend on the type of workpiece to be worked: the coil may have a ring structure or be cylindrical in the case of making a cylindrical object, may be planar for working a metal plate, etc. Furthermore, the design of the coil will also depend on the result to be achieved, namely whether the physical change intended is forming, cutting, perforation, joining or welding.

An apparatus 80 in accordance with another embodiment of the invention is seen in FIG. 6. The apparatus comprises a power supply 82, a capacitor battery 84, switch 86, triggering circuitry 88, a primary working coil 90 and an auxiliary working coil 92, associated with a mechanical waveguide 94. Upon trigger from triggering circuitry 88, electric energy previously charged into capacitor 84 by power supply 82, discharges through coils 90 and 92. Coil 90 induces high velocity movement in at least a portion of one of the two objects to be welded whereas coil 92 generates vibrations in waveguide 94 which are transmitted therethrough to at least one of the two metal objects.

Figure 7:
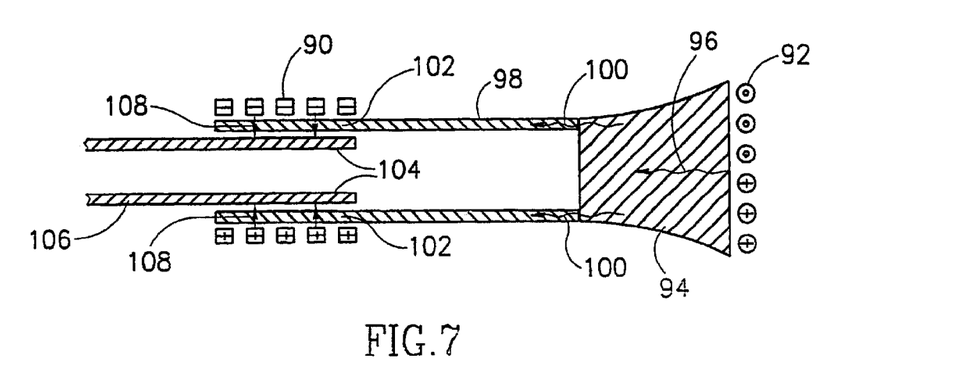
FIG. 7 illustrates an embodiment of the implementation of an apparatus of the kind shown in FIG. 5 for welding two metal tubes to one another.

An illustration of the arrangement of the two coils and the waveguide in an embodiment of the invention for welding together two tubes, is seen in FIG. 7. In FIG. 7, corresponding elements to those seen in FIG. 6, have been given like reference numerals. In this case, a current is discharged simultaneously through coils 90 and 92, whereby coil 92 generates vibrations in waveguide 94, illustrated by arrow 96 and these vibrations then travel into metal tube 98 as illustrated by arrows 100. At the same time, coil 90 causes portion 102 of metal tube 98 to move towards and impact portion 104 of metal tube 106 as illustrated by arrows 108. Typically the discharging current will have an initial frequency of about 10–100 KHz. These combined mechanical forces facilitate welding of the two tubes to one another.

Figure 8:
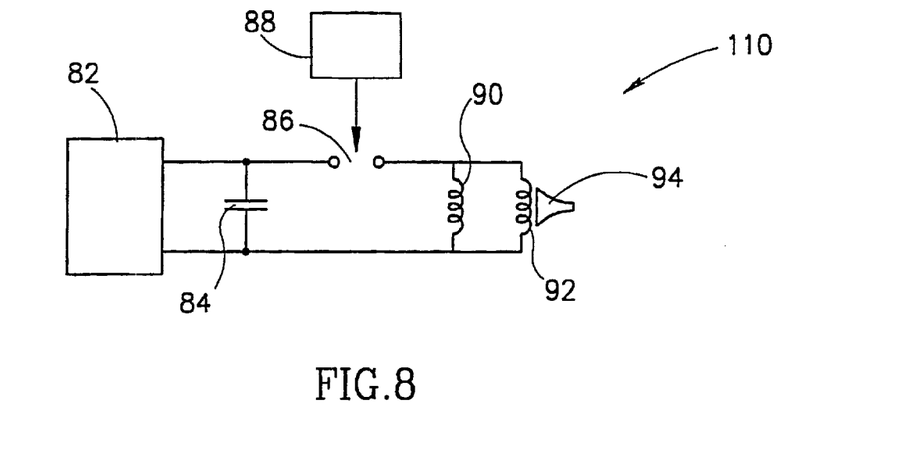
FIGS. 8 and 9 show schemes of two embodiments of apparatuses in accordance with the invention wherein the auxiliary energy is mechanical energy transmitted to the welded object through a waveguide associated with a working coil.
Figure 9:
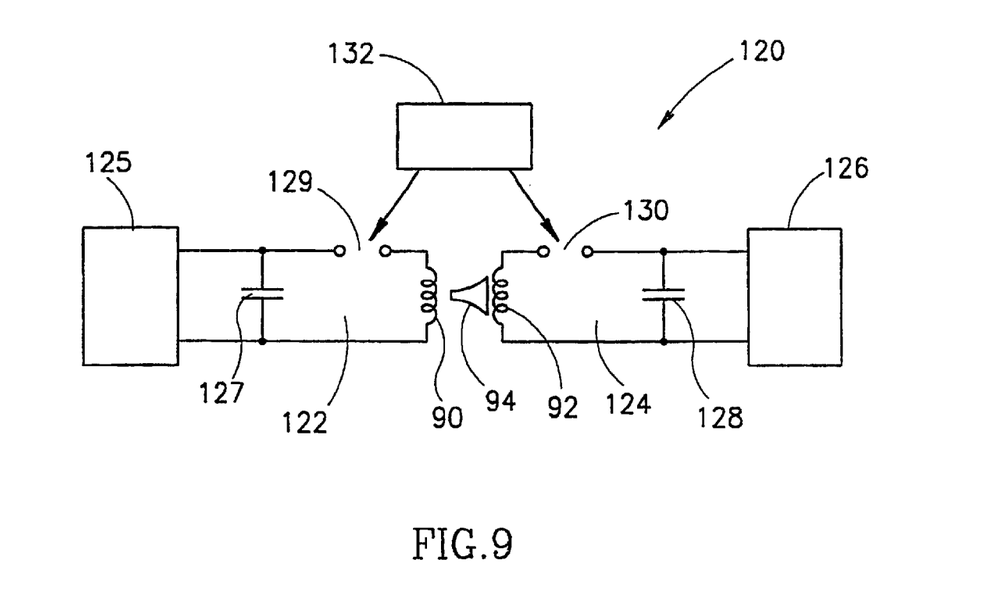

A scheme of two apparatuses 110 and 120 in accordance with two other embodiments of the invention are shown in FIGS. 8 and 9, respectively. These embodiments, similar to that shown in FIG. 6, also comprise a primary working coil 90 and an auxiliary working coil 92, with the latter being associated with a mechanical waveguide 94, (like reference numerals to those used in FIG. 6 have been used here for like elements). The difference between apparatus 110 to apparatus 80 of FIG. 6 is in that in the former, coils 90 and coil 92 are connected in parallel and as a result, whereas in the case of apparatus 80 the same current flow discharges in both coils, the current in the case of apparatus 110 is divided between the two coils, in an inverse proportion to the respective impedances of coils 90 and 92.

In the case of apparatus 120, the primary coil 90 and the auxiliary, waveguide-associated coil 92, are included in independent circuitries 122,124 provided with respective power supplies 125, 126, capacitor batteries 127, 128 and switches 129, 130, controlled by means of discharge control circuitry 132.

Here again the structure or design of the primary coil depends on the discreet result and the type of metal workpiece to be worked and may be, but not limited to a coil of a kind disclosed in WO 97/22426 and WO 98/23400, already mentioned above.

Figure 10:
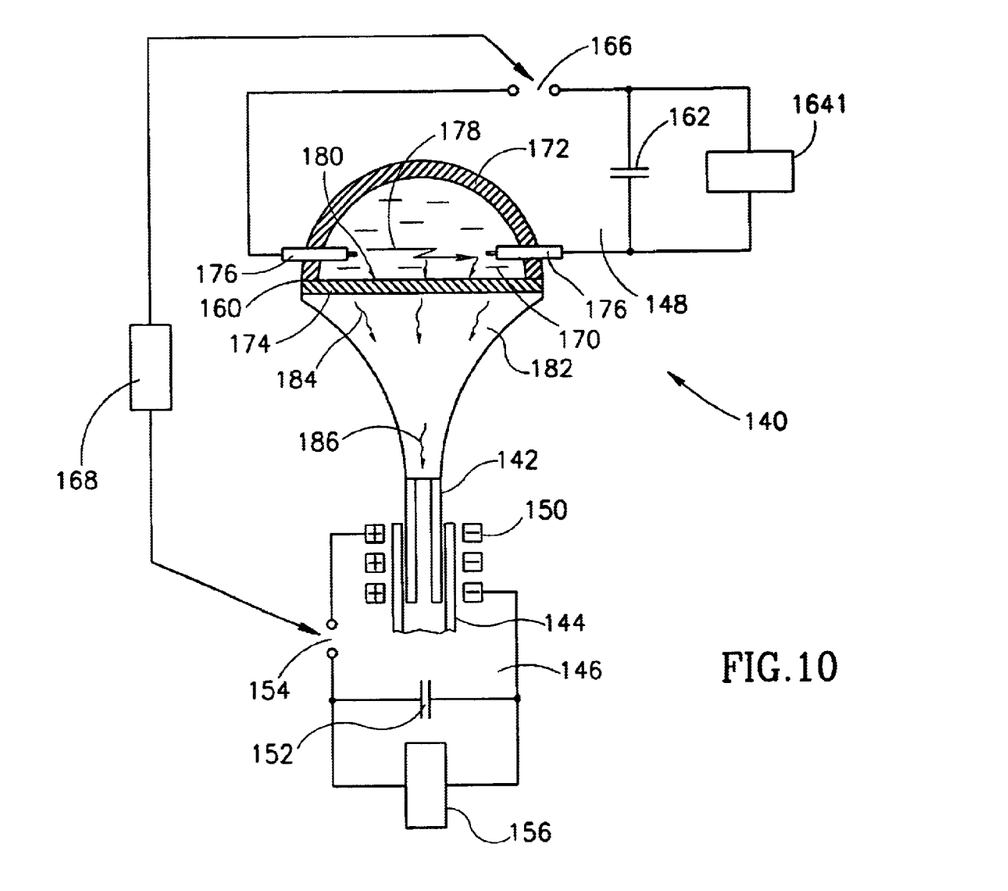
FIG. 10 shows a scheme of an apparatus in accordance with another embodiment of the invention, which in this specific case is fashioned for welding together two metal tubes, wherein the auxiliary energy is a mechanical shock energy generated by a DIF device transmitted to one of the tubes through a mechanical waveguide.

An apparatus 140 in accordance with another embodiment of the invention can be seen in FIG. 10, in this specific example, fashioned so as to be suitable particularly for welding together two tubes 142 and 144. Apparatus 140 comprises two discharge circuitries, a primary discharge circuitry 146 and an auxiliary discharge circuitry 148. Primary discharge circuitry 146 comprises a coil 150, a capacitor battery 152, a switch 154 and a power supply 156. Discharge circuitry 148 comprises a DIF device 160, a capacitor battery 162, a power supply 164 and a switch 166. Switches 154 and 166 are controlled by circuitry 168.

DIF device 160 comprises a chamber 170 defined between rigid wall portions 172 and an elastic wall 174 and accommodating a fluid, which may be a gas or a liquid, and is typically an aqueous solution. A plurality of pairs of electrodes 176 are provided and upon closing of switch 166, an electric current is discharged between the electrodes (represented by arrow 178). Such a discharge causes formation of plasma within the fluid which yields a shock wave travelling towards flexible wall 174 (represented by arrows 180). Wall 174 is in contact with mechanical waveguide 182 and the shock waves then travels through the waveguide (represented by arrows 184) and condense to yield a higher amplitude shock wave at its tapered end (represented by arrow 186).

Figure 11:
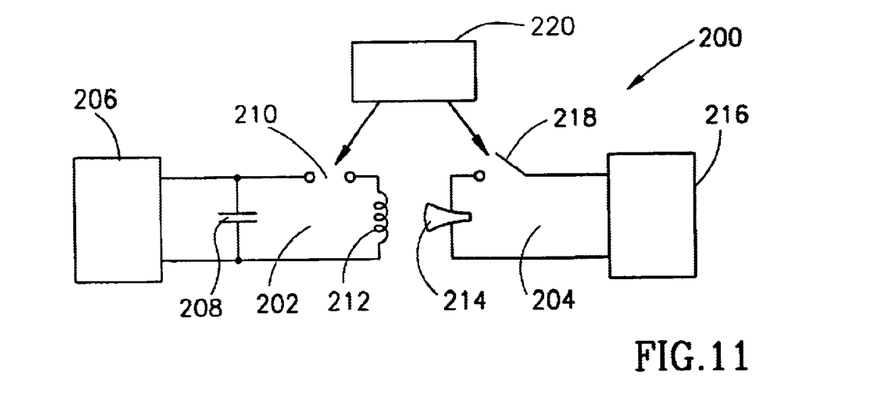
FIG. 11 shows a scheme of another apparatus in accordance with the invention wherein the auxiliary energy is an ultrasonic energy.

A scheme of an apparatus 200 in accordance with another embodiment of the invention is shown in FIG. 11. The apparatus comprises a primary discharge circuitry 202 and an assembly 204. Primary discharge circuitry 202 comprises a power supply 206, a capacitor battery 208, a switch 210 and a primary coil 212. Assembly 204 comprises an ultrasound energy generating device 214, a power generating device 216 and a switch 218. By the use of this apparatus, the resulting physical change, preferably welding, is a combined result of an ultrasonic energy and PMF energy.

The switches 210 and 218 are controlled by means of discharge control circuitry 220.

Figure 12:
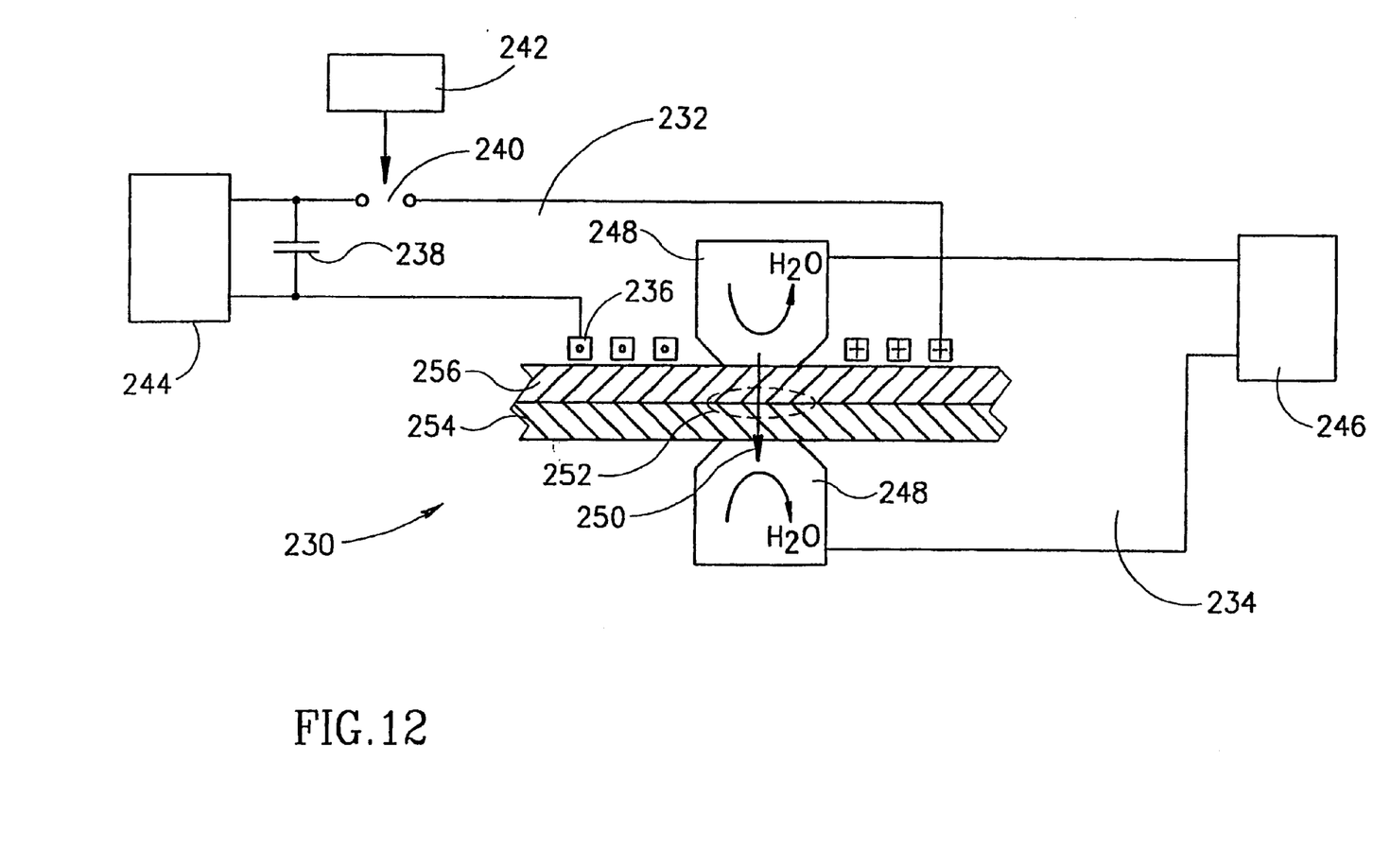
FIG. 12 shows another embodiment of an apparatus in accordance with the invention wherein the auxiliary energy is a resistance heating energy caused by current generated between two current transmitting electrodes.

An apparatus 230 for welding in accordance with another embodiment of the invention can be seen in FIG. 12. By the use of apparatus 230, welding is a combined PMF and resistance welding process. Apparatus 230 comprises a primary discharge circuitry 232 and an assembly 234. Primary discharge circuitry 232 comprises a coil 236, a capacitory battery 238, a switch 240 controlled by triggering circuitry 242 and a power supply 244. Assembly 234 comprises a power supply 246 and a pair of resistance welding electrodes 248. These electrodes pass current in the direction represented by arrow 250 and as a result of increased resistance at the interface 252 between the two metal objects 254, 256, the interface 252 is heated. As known in the art, electrodes 248 are typically cooled by water circulation. In apparatus 230, high welding is achieved by a combination of a PMF and resistance welding processes.

Figure 13A:
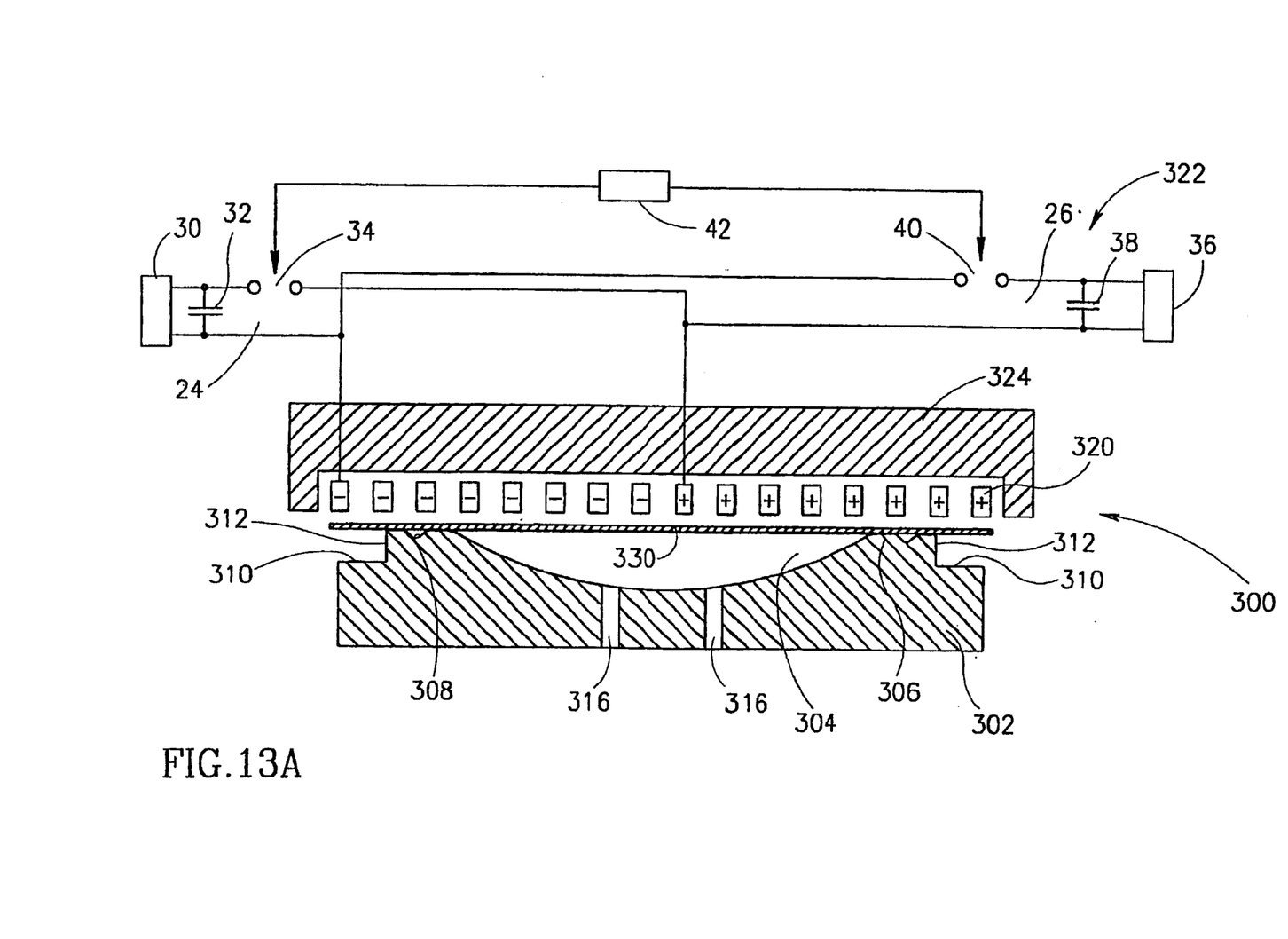
FIG. 13A shows, in cross section, an apparatus in accordance with another embodiment of the invention for simultaneous forming, cutting and perforation of a metal plate.

An apparatus generally designated 300 for working of a metal plate is shown in FIG. 13A. The apparatus comprises a mold 302 with a central inverse dome-shaped recess 304. Recess 304 is defined within an annular ridge 306 accommodating an annular groove 308. Peripheral of ridge 306 is a shoulder portion 310 defined by an upright wall 312. Defined at the bottom of recess 304 are vertical bores 316.

The apparatus further comprises a planar forming coil 320 connected to a discharge system 322 and a coil-support member 324.

Discharge system 322 is in principle similar to the circuitry seen in FIG. 1 and thus functionally like elements have been given like reference numerals and the reader is requested to the description of FIG. 1 for explanations of their function.

The apparatus holds a metal plate 330 which is to be formed, cut and perforated.

Upon current discharge, a superimposed PMF current is generated having, for example, have a shape of the kind shown in FIGS. 2A–2C. Consequently, a magnetic pressure is generated which induces rapid movement of portions of plate 330 in the direction represented by arrows 340 and 342 in FIG. 13B. Consequently, the main central portion of the plate is reformed to yield a general shape defined by mold 302. In addition, the upright walls 312 function essentially as a knife and consequently the plate is cut along a line defined by upright wall 312 yielding a shaped plate 330A, seen separately in FIG. 13C, and a cut-off rim portion 330B.

Figure 13B:
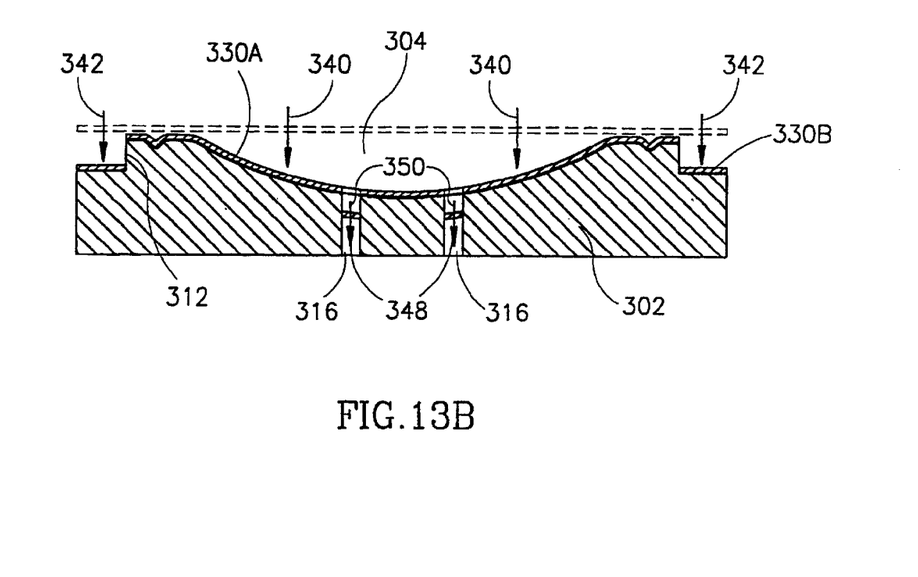
FIG. 13B shows the mold of the apparatus of FIG. 13A with a physically changed metal plate.
Figure 13C:
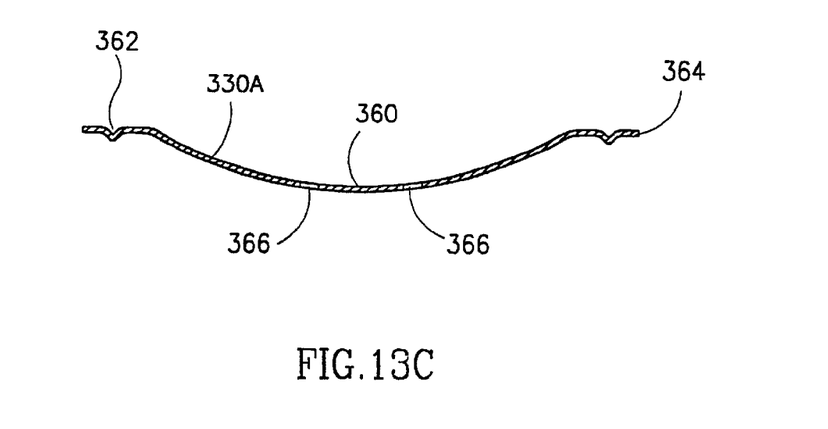
FIG. 13C shows the physically changed metal plate after working by the apparatus of FIG. 13A.

Similarly to upright wall 312 also the rims of bores 316 act as knives and once the shaped plate 330A impacts the walls of recess 304, a portion 348 corresponding in diameter to the diameter of bore 316 is being cut-off and continues to move rapidly through bore 316 as represented by arrows 350 in FIG. 13B. The resulting plate 330A is formed with a central recess 360, a peripheral annular groove 362, with a cut rim 364 and with perforations 366.

What is claimed is:

1. A method for inducing a physical change in at least one metal workpiece, comprising:
    (a) transferring a first pulse sequence of at least one pulse magnetic force (PMF) energy to at least a portion of the at least one workpiece for inducing an intense magnetic pressure therein; and
    (b) transferring an auxiliary energy at least partially co-extensive with the PMF energy to the at least a portion of the workpiece whereupon the PMF and auxiliary energies combine to yield the physical change that includes at least one of forming, cutting and perforating said at least one metal workpiece, or joining or welding said at least one metal workpiece to another metal workpiece;
    wherein said auxiliary energy is a second pulse sequence of independent pulse magnetic force (PMF) energy.

2. A method according to claim 1, wherein the PMF pulses of said first and second pulse sequences are timed to be in succession to one another.

3. A method, for inducing a physical change in at least one metal workpiece, comprising:
    (a) transferring at least one pulse magnetic force (PMF) energy to at least a portion of the at least one workpiece for inducing an intense magnetic pressure therein; and
    (b) transferring an auxiliary energy at least partially co-extensive with the PMF energy to the at least a portion of the workpiece whereupon the PMF and auxiliary energies combine to yield the physical change; and
    inducing a movement in said at least a portion by a combination of two independent PMF pulses;
    wherein a first of the two pulses is generated by an electric current of a maximal amplitude smaller than that of a second of the two pulses, and has a duration longer than the second.

4. A method for inducing a physical change in at least one metal workpiece, comprising:
    (a) transferring a first pulse sequence of at least one pulse magnetic force (PMF) energy to at least a portion of the at least one workpiece for inducing an intense magnetic pressure therein; and
    (b) transferring an auxiliary energy at least partially co-extensive with the PMF energy to the at least a portion of the workpiece whereupon the PMF and auxiliary energies combine to yield the physical change that includes at least one of forming, cutting and perforating said at least one metal workpiece, or joining or welding said at least one metal workpiece to another metal workpiece;
    wherein the auxiliary energy is mechanical energy inducing vibrations in said at least a portion.

5. A method according to claim 4, wherein said mechanical energy is induced by a vibrating waveguide induced to vibrate a PMF-generating coil associated therewith.

6. A method according to claim 4, wherein said mechanical energy is induced by a vibrating waveguide induced to vibrate a discharge-in-fluid (DIF) device associated therewith.

7. A method according to claim 4, wherein said mechanical energy is induced by an ultrasound energy source.

8. A method for welding two metal objects to one another, comprising:
    (a) transferring a first pulse sequence of at least one pulse magnetic force (PMF) energy to at least a portion of the at least one workpiece for inducing an intense magnetic pressure therein; and
    (b) transferring an auxiliary energy at least partially co-extensive with the PMF energy to the at least a portion of the workpiece whereupon the PMF and auxiliary energies combine to yield said welding,
    (c) during a first period of time, generating a primary pulsed magnetic force (PMF) energy by discharging a primary electric current through a primary working coil so as to induce an intense magnetic pressure on at least one portion of a first of the two metal objects to cause said portion to move towards an impact at least one other portion of a second metal object;
    (d) during a second period of time, transferring to at least one of the two metal objects, an auxiliary energy which is other than said primary PMF energy, said first time period and said second time period overlap one another over at least a substantial portion of one of said first or said second time periods, whereby said auxiliary energy in combination with the PMF energy causes welding of the at least two portions to one another.

9. A method according to claim 8, wherein said auxiliary energy is initiated simultaneously with the discharge of the primary electric current.

10. A method according to claim 8, wherein said auxiliary energy is initiated prior to or after discharging of the primary electric current.

11. A method according to claim 8, wherein said auxiliary energy is an auxiliary PMF energy generated by an auxiliary current discharged through a working coil, the auxiliary current having an oscillation frequency substantially higher than the oscillation frequency of the primary current.

12. A method according to claim 11, wherein said auxiliary current has an amplitude which is less than that of said primary current.

13. A method for inducing a physical change in at least one metal workpiece, comprising:

(a) transferring a first pulse sequence of at least one pulse magnetic force (PMF) energy to at least a portion of the at least one workpiece for inducing an intense magnetic pressure therein; and (b) transferring an auxiliary energy at least partially co-extensive with the PMF energy to the at least a portion of the workpiece whereupon the PMF and auxiliary energies combine to yield the physical change that includes at least one of forming, cutting and perforating said at least one metal workpiece, or joining or welding said at least one metal workpiece to another metal workpiece;

wherein said auxiliary energy is mechanical energy delivered by inducing rapid movement in at least one of the two metal objects.

14. A method according to claim 13, wherein the mechanical energy is imparted through a mechanical waveguide in contact with one of the objects by a PMF generated by discharge of current through a working coil associated with the waveguide.

15. A method according to claim 13, wherein the mechanical energy is imparted through a mechanical waveguide in contact with one of the objects by a shock wave generated within a discharge-in-fluid (DIF) device by discharge of current between at least two electrodes embedded in a fluid within the device.

16. A method according to claim 13, wherein said mechanical energy is an ultrasonic energy.

17. A method for inducing a physical change in at least one metal workpiece, comprising:

(a) transferring a first pulse sequence of at least one pulse magnetic force (PMF) energy to at least a portion of the at least one workpiece for inducing an intense magnetic pressure therein; and (b) transferring an auxiliary energy at least partially co-extensive with the PMF energy to the at least a portion of the workpiece whereupon the PMF and auxiliary energies combine to yield the physical change of said at least one metal workpiece, wherein the auxiliary energy is heat induced by passing electric current through the interface between the two portions, which are to be welded to one another.

18. An apparatus for inducing a physical change in at least one metal workpiece, comprising:

(i) at least one PMF unit with a forming coil for the discharge of current therethrough to induce an intense magnetic pressure in at least a portion of the metal workpiece; and (ii) at least one auxiliary energy source for transferring, at least partially co-extensive with the current discharge through the forming coil, an auxiliary energy to the at least a portion of the workpiece such that said pressure and auxiliary energy synergize to yield said physical change that includes at least one of forming, cutting and perforating said at least one metal workpiece, or joining or welding of said at least one metal workpiece to another metal workpiece;

wherein said at least one auxiliary energy source comprises an auxiliary PMF circuitry.

19. An apparatus according to claim 18, wherein said auxiliary PMF circuitry is connected to a working coil, which is a common working coil with said first PMF unit.

20. An apparatus for inducing a physical change in at least one metal workpiece, comprising:

at least one PMF unit with a forming coil for the discharge of current therethrough to induce an intense magnetic pressure in at least a portion of the metal workpiece; and at least one auxiliary energy source for transferring, at least partially co-extensive with the current discharge through the forming coil, an auxiliary energy to the at least a portion of the workpiece such that said pressure and auxiliary energy synergize to yield said physical change that includes at least one of forming, cutting and perforating said at least one metal workpiece, or joining or welding of said at least one metal workpiece to another metal workpiece;

wherein said at least one auxiliary energy source is a mechanical energy source inducing vibrations in said at least a portion.

21. An apparatus according to claim 20, wherein said mechanical energy source is a device comprising a solid member for transmitting a mechanical energy wave to said workpiece, said solid member being associated with a working coil of an auxiliary PMF unit for inducing vibrations in said member.

22. An apparatus according to claim 20, wherein said mechanical energy source is a device comprising a solid member for transmitting a mechanical energy wave to said workpiece, said member being associated with a discharge-in-fluid (DIF) device, in which a shock wave can be generated by discharging current between at least two electrodes connected to a current-discharge circuitry and embedded in a fluid within the device.

23. An apparatus for welding of two metal objects to one another comprising:

at least one PMF unit with a forming coil for the discharge of current therethrough to induce an intense magnetic pressure in at least a portion of the metal workpiece; and at least one auxiliary energy source for transferring, at least partially co-extensive with the current discharge through the forming coil, an auxiliary energy to the at least a portion of the workpiece such that said pressure and auxiliary energy synergize to yield said welding;

a primary electric discharge circuitry with a primary working coil for generating, during a first period of time of a working cycle of the apparatus, a pulsed magnetic force (PMF) to cause at least a portion of a first of the two metal objects to move towards at least a portion of a second of the two metal objects; and a device for generating auxiliary energy, during a second period of time of the working cycle of the apparatus, and transferring energy to at least one of the two metal objects during period of time in which said first period of time and said second period of time overlap one another, whereby said auxiliary energy in combination with the primary PMF energy causes welding of the two portions to one another.

24. An apparatus according to claim 23, wherein the device for generating an auxiliary energy comprises an auxiliary PMF circuitry.

25. An apparatus according to claim 24, wherein the auxiliary circuitry generates current of a lower frequency than that generated by the primary electric circuitry.

26. An apparatus according to claim 24, wherein the current generated in a primary discharge circuitry has lower amplitude than that generated in the primary circuitry.

27. An apparatus according to claim 24, wherein the auxiliary electric circuitry is connected to said primary working coil for discharging electric current therethrough.

28. An apparatus according to claim 23, wherein said device is a device for inducing mechanical shock wave or vibrations in at least one of the objects.

29. An apparatus according to claim 28, wherein said device comprises a mechanical waveguide.

30. An apparatus according to claim 29, wherein said device comprises a waveguide-associated working coil for PMF inducing of a mechanical wave in said waveguide.

31. An apparatus according to claim 29, wherein the waveguide is associated with a discharge-in-fluid (DIF) device; the DIF device comprising a chamber containing a fluid and having discharge electrodes for discharging electric current between them through said fluid; said chamber in contact withy the waveguide such that when electric current is discharged between the electrodes, a shock wave is generated within the fluid that is transmitted to the waveguide.

32. An apparatus according to claim 31, wherein said fluid is an aqueous liquid.

33. An apparatus according to claim 28, adapted for generating an ultrasonic wave and transmitting it to at least one of the two objects.

34. An apparatus according to claim 28, further comprising electrodes and a circuitry for passing current through an interface between the portions of the two objects to be welded to one another.

* * * * *